(12) United States Patent
Staude

(10) Patent No.: US 7,971,894 B2
(45) Date of Patent: Jul. 5, 2011

(54) DEVICE FOR SWIVEL JOINT COUPLING, PARTICULARLY FOR SEMI-TRAILERS

(75) Inventor: Rudolf Staude, Wuppertal (DE)

(73) Assignee: Staude & Company Unternehmensberatung, Wuppertal (DE)

(*) Notice: Subject to any disclaimer, the term of this patent is extended or adjusted under 35 U.S.C. 154(b) by 0 days.

(21) Appl. No.: 12/311,534

(22) PCT Filed: Aug. 11, 2007

(86) PCT No.: PCT/EP2007/007124
§ 371 (c)(1),
(2), (4) Date: Apr. 2, 2009

(87) PCT Pub. No.: WO2008/040413
PCT Pub. Date: Apr. 10, 2008

(65) Prior Publication Data
US 2010/0025963 A1 Feb. 4, 2010

(30) Foreign Application Priority Data
Oct. 7, 2006 (DE) .................. 10 2006 047 456

(51) Int. Cl.
*B62D 53/08* (2006.01)
(52) U.S. Cl. ...................................... 280/432
(58) Field of Classification Search .......... 280/432, 280/423.1, 427, 428
See application file for complete search history.

(56) References Cited

U.S. PATENT DOCUMENTS

| | | | | |
|---|---|---|---|---|
| 3,874,699 A | * | 4/1975 | Hayes et al. | 280/432 |
| 4,065,149 A | * | 12/1977 | Roth | 280/432 |
| 4,204,700 A | * | 5/1980 | Haines, Sr. | 280/432 |
| 4,300,785 A | * | 11/1981 | Mettetal | 280/432 |
| 4,826,198 A | * | 5/1989 | Herbert | 280/432 |
| 4,898,399 A | | 2/1990 | Adams | |
| 5,135,248 A | * | 8/1992 | Keiserman | 280/432 |
| 5,224,727 A | * | 7/1993 | Ramskugler | 280/432 |
| 5,259,640 A | | 11/1993 | Mackey | |
| 5,707,071 A | * | 1/1998 | Prestidge et al. | 280/455.1 |
| 5,912,616 A | * | 6/1999 | Valentino | 340/431 |
| 6,498,977 B2 | * | 12/2002 | Wetzel et al. | 701/70 |
| 7,703,790 B2 | * | 4/2010 | Cunefare et al. | 280/432 |
| 2004/0061307 A1 | * | 4/2004 | Cole | 280/432 |

FOREIGN PATENT DOCUMENTS

| | | |
|---|---|---|
| DE | 35 12 977 | 10/1986 |
| DE | 103 12 302 | 10/2004 |
| FR | 1 406 826 | 7/1965 |
| GB | 1 205 314 | 9/1970 |
| GB | 1 240 554 | 7/1971 |

\* cited by examiner

*Primary Examiner* — Tony H. Winner
(74) *Attorney, Agent, or Firm* — Lucas & Mercanti, LLP; Klaus P. Stoffel

(57) ABSTRACT

A device for the active damping of swivel joint couplings, particularly for semi-trailers, articulated buses, and rail vehicles. The device serves to avoid or reduce dynamic driving instabilities known as yaw, sliding, rocking, oversteering, and jack-knife effects in curves, in lane changes, for example in construction sites, in the case of uneven road contact, and in the case of uneven load distribution, for example in semi-trailers. The damping device includes primarily a rotational assembly (5, 12) and a friction brake (9) which is applied front inside to outside within the rotation assembly. The friction brake minimizes or avoids rotational movements of the vehicle about the vertical axis (10) of the vehicle. The damping moment created by the brake (9) is electronically controlled according to the present driving condition.

13 Claims, 2 Drawing Sheets

DEVICE FOR SWIVEL JOINT COUPLING, PARTICULARLY FOR SEMI-TRAILERS

BACKGROUND OF THE INVENTION

The invention relates to a device for a pivoting coupling, in particular for semi-trailers. Such couplings serve for the connection of a semi-trailer with a traction engine. The first coupling element on the semi-trailer includes a rotary disk pivotal around an axis and incorporated in a chafe plate. On the rotary disk a central pivot is fastened which is detachable with the traction engine via the semi-trailer coupling. This central pivot transfers the pulling forces of the semi-trailer and prevents the unseating of the trailer.

A known pivotal coupling for semi-trailers is known from the German Patent document DE 35 12 977 A1. The pivot bearing between the rotary disk and the chafe plate is formed by an anti-friction bearing in the form of an axial-radial ball bearing. This pivot bearing allows for a relative rotation between traction engine and semi-trailer in a horizontal plane. The disadvantage of this arrangement is that the occurrence of dynamic driving instabilities which have been known for years as sheering, over-steering and under-steering, as Jack-Knife effect and as skidding are not prevented. Driving instabilities of this type have led in the past to numerous severe accidents. They are mainly based on the fact that there exists no buckling safety in semi-trailers with subsequent axes and in dollies, like articulated buses. Furthermore, taxiing is very laborious in the known semi-trailers because, in particular, pushing back the semi-trailer is only possible with frequent follow-up correction.

Another known pivotal coupling for semi-trailers is known from GB 1 205 314. Here, a break device engages on the vertical extension of the central pivot via brake shoes in order to brake the turning movement of the trailer. The disadvantage of this arrangement is that enormous braking forces have to be expended because it engages in the center point of the rotary motion. Thus, much stronger forces are necessary to brake the circular motion of the trailer than if these braking forces would engage on the outer rim of the trailer. Furthermore, no control is provided that measures the dynamic driving conditions and thus activates the brake device in dependence on the momentary condition, this cannot counteract other side motions.

A further pivotal coupling for semi-trailers is known from FR 1 406 826. Here can be seen a similar brake as in GB 1 205 314, only that now the braking is no longer done via brake shoes but via a disk which is arranged on the central pivot. However, through this the above-mentioned disadvantages are not eliminated but rather enormous forces are still needed to counteract side motions in the trailer. Furthermore, there are no swivel ring and guide wedge present that could absorb the relatively great retention forces and tilting forces. Just as there is no mention of a control device that captures the momentary dynamic driving values so that also here side movements, except for the Jack-Knife-effect, cannot be counteracted.

SUMMARY OF THE INVENTION

Therefore it is the object of the invention to provide an improved device for the pivotal coupling, in particular of semi-trailers that prevent the occurrence of driving instabilities and thus considerably reduces the risk of accidents and, furthermore, facilitates precise and economic taxiing of the semi-trailer.

This object is solved with a device having a brake that can effect a damping of the rotational movement around the rotary axis of the coupling. Theoretically, this damping can be guided all the way to the locking of the articulation in a certain kink angle of the parts connected pivotally with each other, for example, the traction engine that is pivotally connected with the semi-trailer. By way of such a presetting of the kink angle through an appropriately sized damping momentum in the swivel joint of the semi-trailer taxiing, in particular, a directionally stable backing-up of the semi-trailer can be performed in a precise manner and in little time without having to correct too many times. While driving, the damping action can be set arbitrarily and serves to prevent sheering movements of the semi-trailer and unstable driving conditions, for example, when driving through curves, changing lanes or due to irregular traction control on slippery or wet road surfaces. This damping of the swivel joint simultaneously effects a damping of vibrations around the vertical axis. The use of the device according to the invention is particularly advantageous for vehicles with subsequent axes.

The device according to the invention for the pivoting coupling includes a first coupling element, for example, on the coupling of the semi-trailer, and a further coupling element, preferably on the underside of the semi-trailer, namely a rotary disk rotatively mounted in the chafe plate of the semi-trailer. This rotary disk is connected in its center with a central pivot which is detachable with the coupling element. Via a pivot bearing the rotary disk together with the central pivot is rotatable around the rotary axis.

In a preferred embodiment the pivot bearing is formed by way of a ball swivel ring, wherein the outer swivel ring is connected with the chafe plate and the inner swivel ring is fixedly connected with the rotary disk. The device provided for damping is in one embodiment formed as a brake and mounted on the chafe plate in such a manner, that a radial outwardly directed movement of the brake shoe in the direction of the inner swivel ring is possible. Through the impact of the brake shoe on the inner swivel ring a friction torque is produced which leads to a damping of the rotary movement. A brake with several brake shoes, several brakes or also other damping devices can be provided.

The brakes can be activated either manually or automatically, preferably by way of a hydraulic aggregate or in a pneumatic manner. For the automatic activation a control unit is provided. This control unit calculates from the current driving data, the driving speed and the kink angle the necessary damping momentum for the swivel bearing. From the established damping momentum the resulting braking forces are determined which, by activating the brake, become effective on the inner side of the inner swivel ring for the respective driving condition with the required chronological process according to measure.

In a special embodiment, the established data, in particular the kink angle, are shown in an indicating device which is preferably located inside the driver's cab. The transfer of the signals can be done either wireless or through the on-board electrical system.

In one embodiment of the device a control unit is additionally provided, that determines the current driving condition from the current vehicle data, the driving speed and the kink angle and compares them with valid predetermined values as well as, in the case of aberration, transmits appropriate signals to the control unit in order to trigger, for example, the actuation of the brake.

The device can be adjusted to different operation modes, like, for example, to the operation mode "driving operation" or to the operation mode "taxing operation". In the operation mode "taxing mode" a preselected kink angle can be set via the brake and which is kept during the taxiing. In this way, for example, the straight backing-up of the trailer truck even in case of considerable unevenness of the road surface is facilitated. For the operation mode "driving mode" empirical values can be entered for the necessary data in the control unit which the control unit can access when calculating the possible damping momentum. The different operation modes can be indicated on the indicating device in the driver's cab.

For the calculation of the current kink angle/swivel angle a sensor is provided which, in extension of the swivel axis of the central pivot, is arranged and fastened above the rotary disk on the chafe plate. Through the guide wedge provided on the rim of the rotary disk the zero position of the semi-trailer coupling of the trailer is fixedly adjusted. The guide wedge thus represents the counter bearing to the damping momentum. Simultaneously, it sets the zero position for the kink angle.

When the semi-trailer dies, i.e., when it rotates around the rotary axis formed by the central pivot, the rotary movement is collected by the sensor and transferred via the control unit to the indicator device so that the kink angle in the driver's cab can be read. By actuating an activation key on the indicating device, the buckling angle can be set while driving or during taxiing and thus an uncontrolled sideways yielding of the trailer can be avoided. In this manner, a taxiing operation can be executed in less time and without frequent follow-up adjustments with the help of the device according to the invention.

BRIEF DESCRIPTION OF THE DRAWINGS

In the following, the invention is described in the drawings by means of an embodiment. They show.

DETAILED DESCRIPTION OF THE INVENTION

Figure 1:
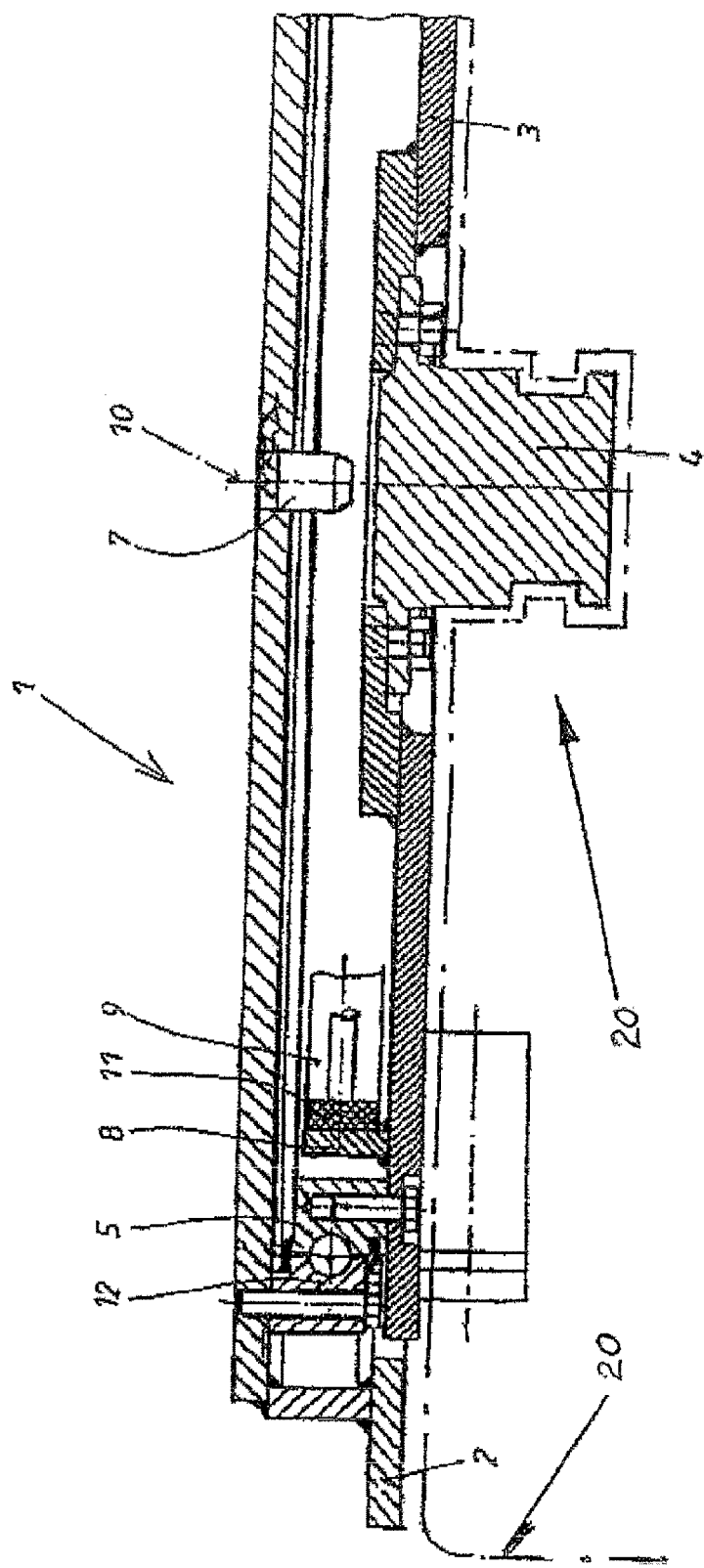
FIG. 1 a detail from a device according to the invention in vertical cross-section, FIG. 2 a detail of the device according to the invention in horizontal cross-section.

In the Figures is shown an extract of the device according to the invention for semi-trailers. A traction engine is coupled by means of a semi-trailer coupling to a semi-trailer. A coupling element is fastened to the vehicle chassis of the trailer truck via a bearing block and the other coupling element includes a chafe plate 2 arranged on the underside of the semi-trailer. In this chafe plate 2 a rotary disk 3 is mounted. In the center of the rotary disk 3 a central pivot 4 is arranged. This central pivot 4 is detachable with the coupling element 20 of the trailer truck. On the outer circumference of the rotary disk a swivel ring 5 is provided which is part of a ball swivel ring. The second half of the ball swivel ring is formed through an outer swivel ring 12 which is fastened to the chafe plate 2.

The swivel ring 5 facilitates the rotary movement of the rotary disk 3 around the rotary axis 10 and thereby a relative rotation between trailer truck and semi-trailer in a horizontal plane. However, other swivel bearings are also possible as swivel joint.

The newly provided swivel joint damping by means of the brake 9 is also integrated within the chafe plate 2, in the embodiment according to FIG. 1 between chafe plate 2 and rotary disk 3 within the inner swivel ring 5. In this manner, the brake 9 can influence the inner swivel ring 5 with its brake shoe 11.

In the embodiment according to FIG. 1, an additional separate ring 8 is arranged within the inner swivel ring 5, so that the brake 9 does not exercise the damping momentum directly on the inner swivel ring 5 but through the ring 8. The brake 9 is connected with a brake shoe 11 which, from an initial state without influence on the inner swivel ring 5 or the ring 8, is displaceable by activating the brake 9 in radial direction outwardly until touching and/or fastening the inner swivel ring 5 or the ring 8, and thus effects through the produced friction torque a damping or fastening. In FIG. 1 and in FIG. 2 there is solely provided one brake 9 with one brake shoe 11. However, it is possible to equip a brake 9 with several brake shoes 11 or to provide several brakes 9. The production of the friction torque thus occurs through the impact on the inner swivel ring 5 or the ring 8 of the rotary disk 3.

Naturally, a damping can also be produced by acting from the outside upon an outer swivel ring if this outer swivel ring is part of the rotary disk. In such a case the inner swivel ring would be fixedly arranged on the chafe plate. The configuration shown in FIGS. 1 and 2, however, is the preferred embodiment since the brake 9 engaging on the swivel bearing (5, 12) from inside can be designed more compact and thanks to its arrangement within the inner swivel ring (5) is also protected from dirt and encroachments.

The operation of the brake 9 can be executed manually and/or automatically, in particular it can be operated from a control unit which is not shown. In the control unit, chronologically different current braking forces for damping are established from vehicle data stored in the control unit, from driving speeds and kink angles and the drive unit, for example, a hydraulic power unit, is contacted and activated. In addition, the data can be transferred further to an indicating unit, whereby this indicating unit is preferably placed inside the driver's cab, so that the steering and activation of the brake can also be followed from inside the driver's cab.

Figure 2:
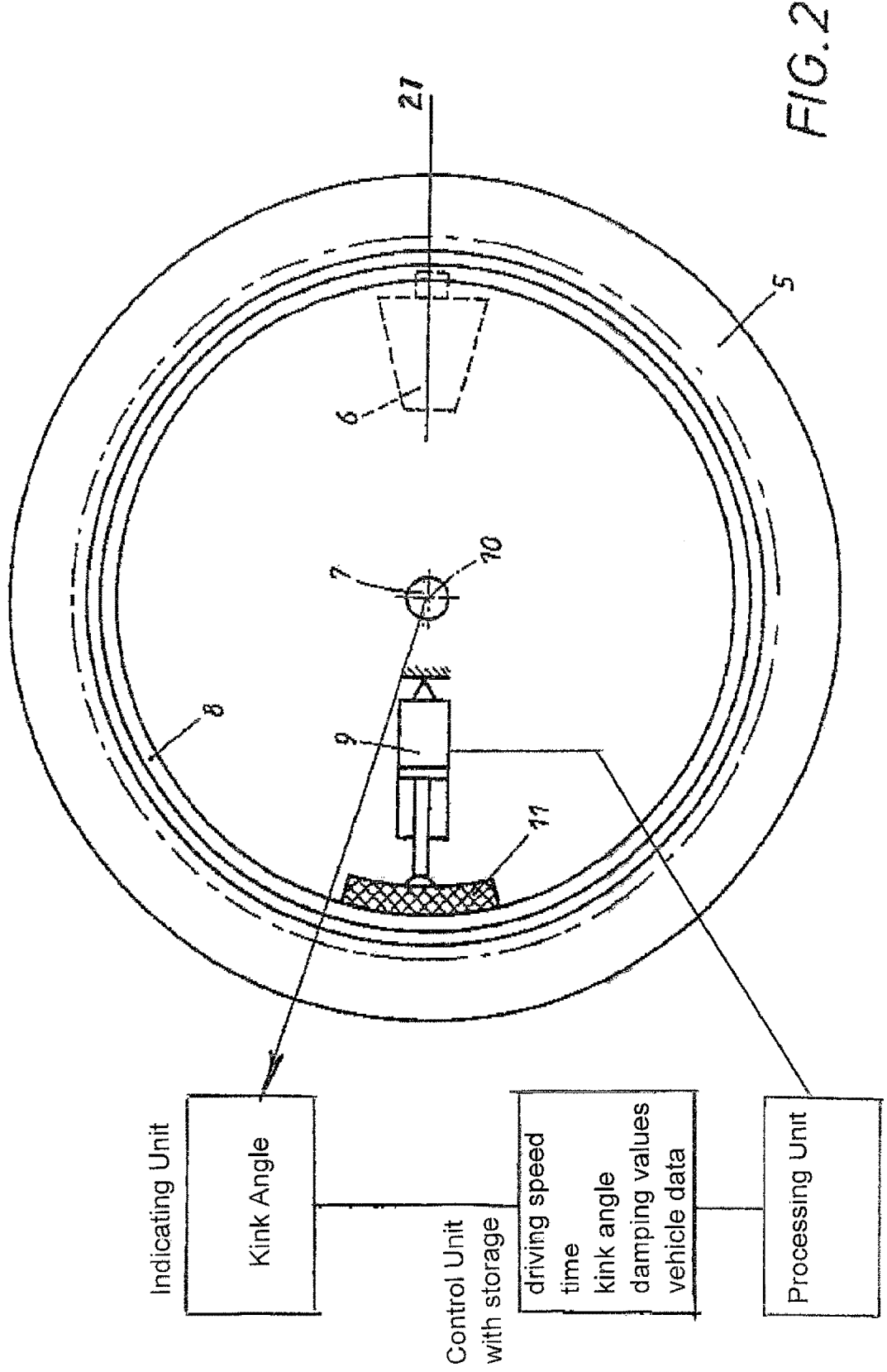

In an indicating unit further indicators can be additionally provided, namely, the activated mode of operation, selectable between the operation mode "driving mode" or "taxiing mode". Furthermore, the current kink angle can be indicated. The kink angle is captured by using a sensor 7, preferably contactless. This sensor 7 is arranged on the chafe plate 2 above the central pivot 4 in extension of the rotary axis 10. The zero position 21 of the kink angle is determined separately. In FIG. 2, a guide wedge 6 is provided for this purpose and which is arranged on the outer rim of the rotary disk 3. A departure from this position is registered by the sensor 7 as kink angle and is transferred to the control unit as signal. From the control unit, a respective information is sent to the indicating unit which makes the kink angle readable for the driver.

In the operation mode "driving mode", the damping momentum is controlled time-dependent from the current vehicle condition. The current damping values are calculated based on vehicle data stored in the control unit or entered via programming (construction data), driving speed and the kink angle/rotary angle. The thus obtained necessary brake forces for the current damping momentum are transmitted from the control unit via respective signals to the brake system, for example, a hydraulic system.

For the operation mode "taxiing mode", a predetermined kink angle can be set, for example, via an appropriate key of the indicating unit in the driver's cab or via manual activation of the brake 9. With a preset kink angle a trailer truck is easier to maneuver, in particular backing-up over longer distances in the predetermined lane. When maneuvering with constant kink angle or when parking with changing kink angle, the brake momentum for the activated swivel bearing damping is so great that the semi-trailer can be maneuvered directionally stable in spite of variable resistances on the individual wheels. Such variable resistances are caused by, for example, from driving over a curb, uneven road surface, uneven adhesive conditions on the road surface caused by humidity, slickness or because of unevenly distributed load in the semi-trailer. The damping momentum during activated taxiing support is so great that the veering of the semi-trailer because of asymmetrically acting forces (counter torque) is prevented. The input necessary during maneuvering is thus reduced and the time expenditure is considerably less. Upwards, the brake momentum has to be adjusted in such a manner that in case of faulty operation or in case of driving mistakes damage to the draw gear through too strong damping momentums can be adjusted.

The uninterrupted indication and visualization of the kink angle during driving and maneuvering and the practice of empirical data makes it possible to optimize the maneuvering process in terms of time and space. An uncontrolled veering of the semi-trailer from the given direction during maneuvering is largely avoided through the device according to the invention.

The embodiment of the invention as shown in the drawings and as describes is only exemplary, the invention is by no means restricted to this embodiment. In fact, various changes and other embodiments of the object of the invention are conceivable. For example, the swivel bearing of the rotary disk 3 is not restricted to a ball swivel ring 5. The arrangement of the sensor or the brake can be chosen according to the structural conditions. The actuator for the brake, the control unit and the indicating unit are not shown in the FIGS., since the actuating mode, the presence of a control unit and an indicating unit can be chosen by the user according to their desired necessities.

The invention claimed is:

1. A device for detachable coupling of a semi-trailer, with a first coupling element including a rotary disk (3) rotatable around a rotary axis (10) and mounted in a chafe plate (2) as well a central pivot (4) fixedly connected to the rotary disk (3) which is detachable with a second coupling element, wherein,
    in the device (1) in an area of the chafe plate (2) at least one damping element is integrated which effects a damping of a swivel movement around the rotary axis (10),
    wherein the damping element is a brake (9),
    wherein the brake (9) is fixed to the chafe plate (2) above the rotary disk (3),
    wherein a swivel joint is provided for detachable coupling, and wherein an outer swivel ring (12) is mounted on the chafe plate (2) and an inner swivel ring (5) is arranged on a circumferential rim of the rotary disk (3).

2. The device according to claim 1, wherein the brake (9) has at least one brake shoe (11) which is displaceable in radial outward direction when activating the brake (9).

3. The device according to claim 1, wherein the brake (9) can be operated manually or automatically.

4. The device according to claim 3, wherein the brake (9) is accessible automatically through a processing unit which is connected with at least one of an indicating unit and a control unit.

5. The device according to claim 4, wherein the indicating unit is arranged inside a driver's cab of a trailer truck and the indicating unit can be set up for different operation modes, including the operation modes "driving mode" and "taxiing mode".

6. The device according to claim 5, wherein the indicating unit indicates aside from the operation mode additionally the current kink angle.

7. The device according to claim 5, wherein for the operation mode "taxiing mode" a chosen kink angle can be adjusted and be preset by means of the brake (9) or of another damping element.

8. The device according to claim 4, wherein in the control unit empirical data for vehicle data, driving speeds, kink angles and optimum damping values is stored.

9. The device according to claim 4, wherein the signals between the processing unit and the indicating unit and/or the control unit are transferred in a wireless manner or via an on-board electrical system.

10. The device according to claim 4, wherein the processing unit determines a necessary damping momentum for a respective current driving condition from a current vehicle data, driving speed and kink angle in order to activate the brake (9) accordingly.

11. The device according to claim 10, wherein the kink angle is collected via a sensor (7), wherein the sensor (7) is fixedly mounted above the rotary disk (3) at the chafe plate (2) in extension of the rotary axis (10) of the central pivot (4).

12. The device according to claim 11, wherein a guide wedge (6) is arranged on the rim of the rotary disk (3) for capturing of a zero position of the kink angle through the sensor (7).

13. The device according to claim 1, wherein the central pivot is designed as tensile load bolt for determination of a current tensile load of the semi-trailer.

* * * * *